United States Patent
Tanabe et al.

(10) Patent No.: US 9,669,548 B2
(45) Date of Patent: Jun. 6, 2017

(54) MOBILE COLLABORATIVE ROBOT

(71) Applicant: FANUC Corporation, Yamanashi (JP)

(72) Inventors: Yoshikiyo Tanabe, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 22 days.

(21) Appl. No.: 14/811,868

(22) Filed: Jul. 29, 2015

(65) Prior Publication Data

US 2016/0031086 A1 Feb. 4, 2016

(30) Foreign Application Priority Data

Jul. 31, 2014 (JP) ................................. 2014-157103

(51) Int. Cl.
*G05B 19/04* (2006.01)
*B25J 9/16* (2006.01)

(52) U.S. Cl.
CPC ............ *B25J 9/1694* (2013.01); *Y10S 901/01* (2013.01); *Y10S 901/02* (2013.01); *Y10S 901/46* (2013.01); *Y10S 901/50* (2013.01)

(58) Field of Classification Search
CPC combination set(s) only.
See application file for complete search history.

(56) References Cited

U.S. PATENT DOCUMENTS

| | | | |
|---|---|---|---|
| 7,031,807 B2 * | 4/2006 | Heiligensetzer | B25J 13/084 700/245 |
| 8,634,955 B2 * | 1/2014 | Oaki | G05D 1/0227 15/320 |
| 8,965,579 B2 * | 2/2015 | Wang | B25J 9/1689 700/259 |
| 9,323,250 B2 * | 4/2016 | Wang | G05D 1/028 |
| 9,333,648 B2 * | 5/2016 | Kim | B25J 9/1612 |
| 2006/0079817 A1 * | 4/2006 | Dewald | A61H 1/02 601/5 |
| 2006/0129278 A1 * | 6/2006 | Sugiyama | B25J 13/085 700/245 |

(Continued)

FOREIGN PATENT DOCUMENTS

JP 63-127888 A 5/1988
JP 2005-59160 A 3/2005
(Continued)

*Primary Examiner* — Jonathan L Sample
(74) *Attorney, Agent, or Firm* — Hauptman Ham, LLP

(57) ABSTRACT

A mobile collaborative robot includes a force sensor which is provided on a robot support on a carriage, a robot information acquisition unit which acquires robot information including posture information of the robot main body and load information of a load acting on the robot main body, a force calculation unit which calculates the external force acting on the robot support based on the robot information, and a judgment unit which judges that the mobile collaborative robot has come into contact with a human when a difference between the external force detected by the force sensor and the external force calculated by the force calculation unit is above a predetermined value α or when a difference between the amount of change in the detected external force and the amount of change in the calculated external force is above a predetermined value α1.

10 Claims, 5 Drawing Sheets

(56) References Cited

U.S. PATENT DOCUMENTS

| | | | | |
|---|---|---|---|---|
| 2006/0293617 A1* | 12/2006 | Einav | ............... | A61H 1/0274 601/33 |
| 2007/0282228 A1* | 12/2007 | Einav | ............... | A63B 21/4021 601/33 |
| 2008/0231221 A1* | 9/2008 | Ogawa | ............... | B25J 5/007 318/568.12 |
| 2009/0171505 A1* | 7/2009 | Okazaki | ............... | B25J 9/1676 700/258 |
| 2009/0281661 A1* | 11/2009 | Dooley | ............... | B60L 3/106 700/258 |
| 2010/0152896 A1* | 6/2010 | Komatsu | ............... | B25J 9/0003 700/258 |
| 2010/0206651 A1* | 8/2010 | Nagasaka | ............... | B25J 5/007 180/218 |
| 2010/0286826 A1* | 11/2010 | Tsusaka | ............... | B25J 9/1633 700/254 |
| 2011/0054689 A1* | 3/2011 | Nielsen | ............... | G05D 1/0088 700/258 |
| 2011/0202175 A1* | 8/2011 | Romanov | ............... | A47L 11/4011 700/250 |
| 2012/0245733 A1* | 9/2012 | Bjorn | ............... | B25J 9/1676 700/253 |
| 2013/0184980 A1* | 7/2013 | Ichikawa | ............... | B25J 9/1676 701/301 |
| 2014/0288703 A1* | 9/2014 | Takagi | ............... | B25J 9/1633 700/245 |
| 2016/0279796 A1* | 9/2016 | Naitou | ............... | B25J 9/1676 |

FOREIGN PATENT DOCUMENTS

| | | |
|---|---|---|
| JP | 2006-21287 A | 1/2006 |
| JP | 2007-054942 A | 3/2007 |
| JP | 2008-6517 A | 1/2008 |
| JP | 2010-208003 A | 9/2010 |
| JP | 2011-110630 A | 6/2011 |
| JP | 2013-94935 A | 5/2013 |
| JP | 2016-163928 A | 9/2016 |

* cited by examiner

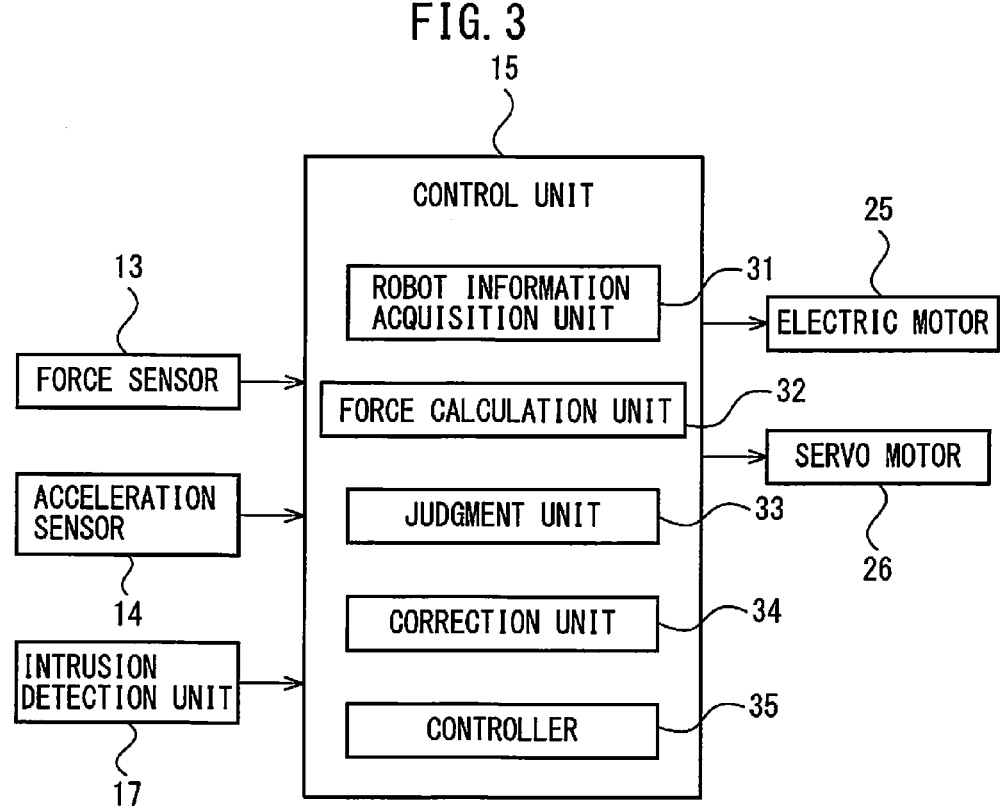
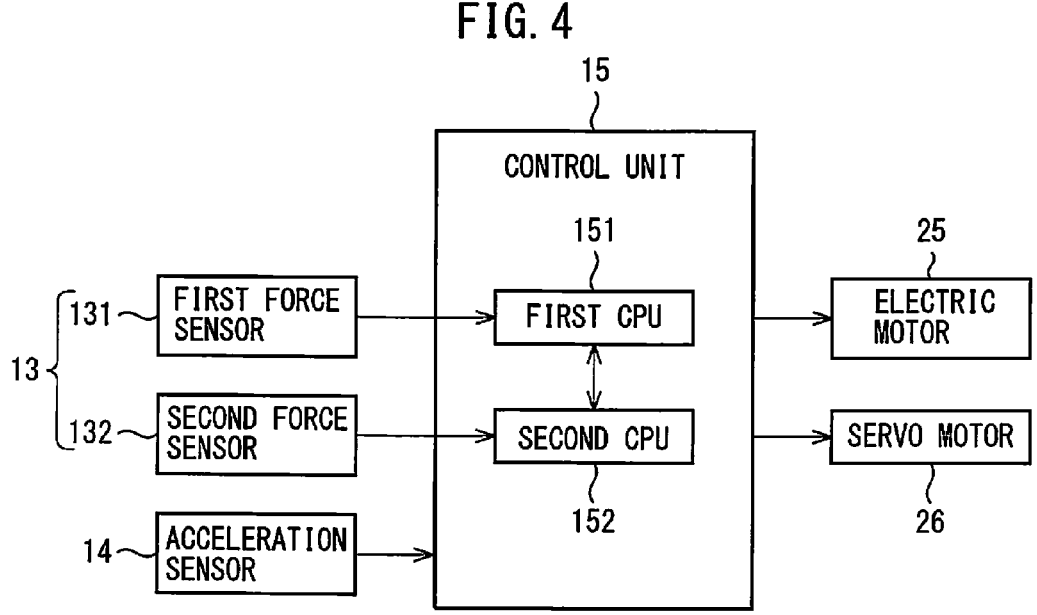

MOBILE COLLABORATIVE ROBOT

RELATED APPLICATIONS

The present application claims priority to Japanese Application Number 2014-157103, filed Jul. 31, 2014, the disclosure of which is hereby incorporated by reference herein in its entirety.

BACKGROUND OF THE INVENTION

1. Technical Field

The present invention relates to a mobile collaborative robot which operates in cooperation with a human.

2. Description of Related Art

In a mobile collaborative robot in which the robot is mounted on a carriage so as to be movable, there is a possibility that a human makes contact with the robot or the carriage, and accordingly, it is necessary to enhance the safety upon contact. Regarding contact with a robot, in conventional devices, a force sensor is provided on the base of the robot to detect the contact of the robot with the external environment (e.g., Japanese Unexamined Patent Publication No. 2011-110630). However, the robot disclosed in Japanese Unexamined Patent Publication No. 2011-110630 is not a mobile robot, and accordingly, contact between a human and a carriage is not taken into consideration.

A self-travelling robot is known wherein a shock sensor is provided on a peripheral surface of a main body of the robot, so that contact of the robot with an obstacle can be detected by the shock sensor (e.g., Japanese Unexamined Patent Publication No. 2007-54942).

However, in order to precisely detect the contact of the self-travelling robot with an obstacle by the shock sensor, it is necessary to provide a large number of shock sensors, thus resulting in not only an increase of the manufacturing cost but also troublesome operations required to determine the optimal mounting positions and postures of the shock sensors. In particular, in an industrial robot, such as a perpendicular articulated robot, when the robot operates, the posture of the robot changes in various ways, and accordingly, when the industrial robot is a self-travelling-type robot, it is difficult to precisely detect contact thereof with an obstacle by the shock sensors.

SUMMARY OF THE INVENTION

According to an embodiment of the present invention, there is provided a mobile collaborative robot which carries out tasks in cooperation with a human, comprising a carriage which has a robot support and which is moved by driving a first actuator, a robot main body which is supported by the robot support on the carriage and which is operated by driving a second actuator, a force sensor which is provided on the robot support to detect an external force acting on the robot support, a robot information acquisition unit which acquires robot information including posture information of the robot main body and load information of a load acting on the robot main body, a force calculation unit which calculates the external force acting on the robot support based on the robot information acquired by the robot information acquisition unit, and a judgment unit which judges that the mobile collaborative robot has made contact with a human when a difference between the external force detected by the force sensor and the external force calculated by the force calculation unit is above a predetermined value or when a difference between the amount of change in the external force detected by the force sensor and the amount of change in the external force calculated by the force calculation unit is above a predetermined value.

The aforementioned and other objects, features and merits of the present invention will become more apparent from the detailed description of the representative embodiments of the present invention illustrated in the accompanying drawings.

BRIEF DESCRIPTION OF THE DRAWINGS

FIG. 3 is a block diagram showing a modified example of FIG. 2.

FIG. 4 is a block diagram showing another modification of FIG. 2.

DETAILED DESCRIPTION

Figure 1:
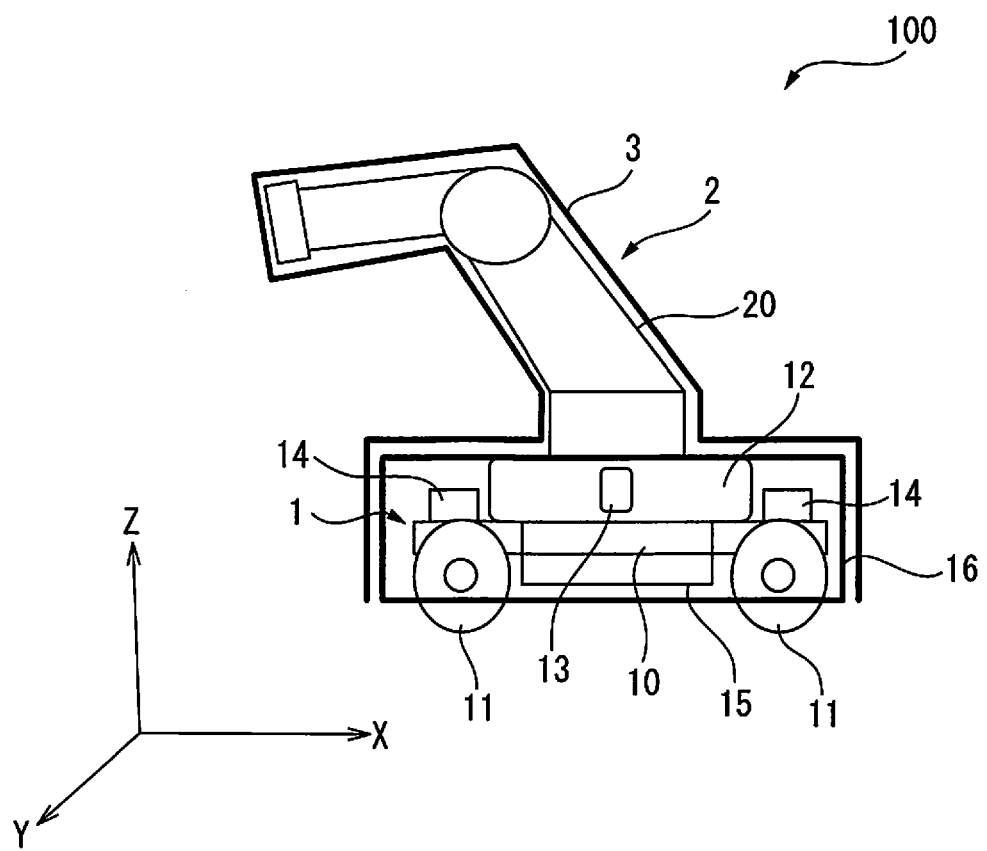
FIG. 1 is a side view schematically showing the structure of a mobile collaborative robot according to an embodiment of the present invention.

Embodiments of the present invention will be discussed below with reference to FIGS. 1 to 7. FIG. 1 is a side view which schematically shows a mobile collaborative robot 100 according to an embodiment of the present invention. The mobile collaborative robot 100 is composed of a movable carriage 1, and a robot 2 placed on the carriage 1, so that the robot 2 is movable in accordance with the movement of the carriage 1. Note that in the following the mobile collaborative robot 100 is referred to merely as a robot, and the robot 2 is referred to as a robot main body to distinguish the robot 2 from the robot 100. Moreover, in the following discussion, for convenience' sake, the length direction (X direction) of the carriage 1, the width direction (Y direction), and the height direction (Z direction) are defined to be the forward/backward direction, the right/left direction, and the upward/downward direction, respectively. The components of the robot will be explained in accordance with this definition.

The carriage 1 has a substantially rectangular frame 10 which extends in the forward/backward and right/left directions. A pair of front and rear wheels 11 are attached to each of the right and left sides of the frame 10, so that the carriage 1 is movable through the four wheels. The wheels 11 are rotated by an electric motor. A robot support 12 is secured to the upper surface of the frame 10 at the center portion in the forward/backward direction and in the right/left direction. A force sensor 13 is provided on the robot support 12. The force sensor 13 is a six-axis force sensor which is composed of strain gauges adhered to an elastic body to detect the external forces in the six axis directions. It is possible for the force sensor 13 to simultaneously detect the external forces acting on the robot support 12 in the X direction, Y direction and Z direction and the external forces (torques) about the X axis, Y axis and Z axis.

Acceleration sensors 14 are provided on the upper surface of the frame 10 in front of and in the rear of the robot support 12 to detect the acceleration of the carriage 12 when the carriage 12 moves. A control unit 15 is attached to the bottom surface of the frame 10. An outer casing 16 is secured to the upper surface of the robot support 12. The outer casing 16 is in the form of a box which covers the entirety of the carriage 1. The wheels 11, the robot support 12, the control unit 15, etc., are arranged on the inside of the outer casing 16. The outer casing 16 is made of a material having a high rigidity, such as metal. Therefore, when a human or obstacle comes in contact with the outer casing 16, the external force is transmitted to the robot support 12 through the outer casing 16, so that the external force is detected by the force sensor 13.

The carriage 1 is provided with a battery (not shown) which supplies electric power to the control unit 15 and a communicating unit (not shown) which communicates with an external device or outside of the robot 100. The control unit 15 is capable of communicating with the external device through the communicating unit. The provision of the control unit 15, the battery, and the communicating unit on the carriage 1 makes it unnecessary to extend and connect a power supply cable and a communication cable to the carriage 1, thereby to facilitate the movement of the carriage 1.

The robot main body 2 is a perpendicular articulated robot having a pivotable arm 20, wherein a workpiece can be held by a hand (not shown) provided at the tip of the arm 20. The robot main body 2 (arm, hand, etc.) is actuated by driving the servo motor. The arm base end is secured to the robot support 12, so that the arm 20 extends upward from the robot support 12. Therefore, when a human or an obstacle comes in contact with the robot main body 2, the external force is transmitted to the robot support 12 and is detected by the force sensor 13. The outer casing 16 of the carriage 1 and the robot main body 2 are entirely covered by a protection member 3. The protection member 3 is made of a material whose rigidity is lower than that of the outer casing 16 so as to reduce the external force acting on a human or an obstacle when the outer casing 16 or the robot main body 2 makes contact therewith. The force sensor 13 detects the external force applied to the robot support 12 through the protection member 3 and the outer casing 16.

Figure 2:
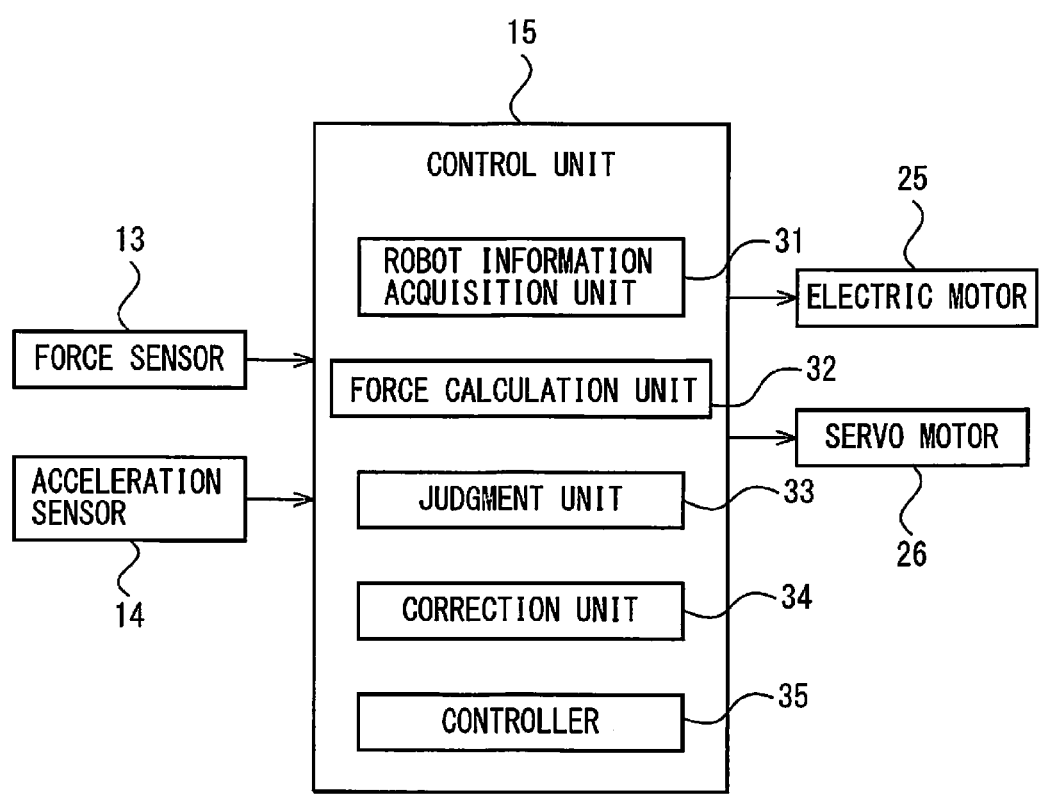
FIG. 2 is a block diagram of a control mechanism of the mobile collaborative robot shown in FIG. 1.

FIG. 2 is a block diagram showing the control mechanism of the robot 100. Signals from the force sensor 13 and the acceleration sensors 14 are input to the control unit 15. The control unit 15 performs predetermined operations based on the signals supplied from the sensors 13 and 14 and outputs respective control signals to the electric motor 25 for driving the carriage and the servo motor 26 for driving the robot. The control unit 15 includes a computer composed of an arithmetic calculation unit having a CPU, ROM, RAM and other peripheral circuits, etc., and comprises, as functional components, a robot information acquisition unit 31, a force calculation unit 32, a judgment unit 33 a correction unit 34, and a controller 35.

The robot information acquisition unit 31 acquires robot information including posture information of the robot main body 2 and load information of the load acting on the robot main body 2. For example, the posture of the robot main body 2 is calculated to obtain the posture information based on the signal supplied from a rotation angle detector incorporated in the servo motor 26 and a preset arm configuration which represents the shape of the arm 20. The operation acceleration of the robot main body 2 is calculated based on the signal supplied from the rotation angle detector, and the mass of the workpiece held by the hand is calculated based on a signal supplied from a load detector provided at the tip of the arm to thereby acquire the load information. Note that the load information includes masses of the arm 20, the outer casing 16, and the hand, etc.

The force calculation unit 32 calculates the external force Fc acting on the robot support 12 based on the robot information acquired by the robot information acquisition unit 31, i.e., the posture information and the load information of the robot main body 2. For instance, when the robot main body 2 rests, the center of gravity of each part of the robot main body 2 is calculated based on the posture information of the robot main body 2, and the external force Fc is calculated on the assumption that the gravity of each part of the robot main body 2 acts at the center of gravity and that the gravity of the workpiece acts on the hand. During the operation of the robot main body 2, the external force Fc is calculated taking the operation acceleration of the robot main body 2 into consideration.

The judgment unit 33 judges whether the difference $\Delta F$ between the external force F detected by the force sensor 13 (detected external force) and the external force Fc calculated by the force calculation unit 32 (calculated external force) is above a predetermined value $\alpha$. The predetermined value $\alpha$ is a threshold value based on which the contact of the carriage 1 or the robot main body 2 with a human is judged and which is determined taking a possible error of the external force calculated by the force calculation unit 32 and a possible error of the external force detected by the force sensor 13, etc., into consideration. When none of the carriage 1 and the robot main body 2 make contact with a human, the difference $\Delta F$ between the detected external force F and the calculated external force Fc is below the predetermined value $\alpha$. Conversely, if the carriage 1 or the robot main body 2 makes contact with a human, the detected value of the force sensor 13 changes, so that the difference $\Delta F$ between the detected external force F and the calculated external force Fc is above the predetermined value $\alpha$. Thus, the contact of the robot 100 with the human can be detected.

Alternatively, the judgment unit 33 may judge that the robot 100 has made contact with a human when a difference $\Delta F1$ between the amount of change of the external force F detected by the force sensor 13 within a predetermined period of time and the amount of change of the external force Fc calculated by the force calculation unit 32 within the aforementioned predetermined period of time is above a predetermined value $\alpha 1$, instead of when the difference $\Delta F$ between the detected external force F and the calculated external force Fc is above the predetermined value $\alpha$.

The correction unit 34 corrects the external force F detected by the force sensor 13 based on the acceleration detected by the acceleration sensor 14. In other words, when the carriage 1 is accelerated or decelerated, when the carriage 1 vibrates due to the movement of the carriage 1, and even if the robot main body 2 rests, the external force acts on the robot support 12, so that the external force F detected by the force sensor 13 changes. Consequently, the difference $\Delta F$ between the detected external force F and the calculated external force Fc changes, and as a result, the judgment unit 33 may erroneously judge that the contact between the robot 100 and a human has occurred. To prevent this, the correction unit 34 corrects the value F detected by the force sensor 13 so as to eliminate an influence of the acceleration or deceleration or vibration of the carriage 1.

In this case, the judgment unit 33 judges whether the difference $\Delta F$ between the corrected external force Fa and the calculated external force Fc is above the predetermined value $\alpha$ and determines that the robot 100 makes contact with the human when the difference $\Delta F$ is above the predetermined value α. In place of this structure, the judgment unit 33 may judge that the robot 100 has made contact with a human when the difference ΔF1 between the amount of change of the corrected external force F within a predetermined period of time and the amount of change of the external force Fc calculated by the force calculation unit 32 within the aforementioned predetermined period of time is above a predetermined value α1.

The controller 35 outputs respective control signals to the electric motor 25 and the servo motor 26 based on the predetermined operation program of the robot 100. Furthermore, the controller 35 outputs respective control signals (stop signals) to the electric motor 25 and the servo motor 26 to stop the operation of the carriage 1 and the robot 2 when the judgment unit 33 judges that robot 100 has made contact with the human. Consequently, when the robot 100 makes contact with the human, the robot 100 is immediately stopped, thus resulting in the provision of high safety.

Note that the controller 35 may control the electric motor 25 and the servo motor 26 to operate the carriage 1 or the robot main body 2 in the horizontal direction to reduce the detected external force F when the difference ΔF between the external force F detected by the force sensor 13 in the horizontal direction and the corresponding external force calculated by the force calculation unit 32 in the horizontal direction is above a predetermined value β but is below a predetermined value α. In this connection, when the predetermined values α and β are referred to as the first predetermined value and the second predetermined value, respectively, the first predetermined value α and the second predetermined value β satisfy α>β. Therefore, when the external force F which is greater than the second predetermined value β but is smaller than the first predetermined value α is detected in accordance with the forward movement of the carriage 1 or the robot main body 2, the carriage 1 or the robot main body 2 is moved in the opposite movement direction, i.e., in the backward direction. Therefore, the contact force between the robot 100 and the human can be reduced, so that it is possible to prevent in advance the robot 100 from being stopped.

According to the present invention, the following mode of operation and effects can be brought about.

(1) The robot 100 is composed of the force sensor 13 which is provided on the robot support 12 on the carriage 1 to detect the external force F acting on the robot support 12, the robot information acquisition unit 31 which acquires robot information including posture information of the robot main body 2 and the load information of the load acting on the robot main body 2, the force calculation unit 32 which calculate the external force Fc acting on the robot support 12 based on the robot information acquired by the robot information acquisition unit 31, and the judgment unit 33 which judges that the robot 100 has made contact with a human when the difference ΔF between the detected external force F and the calculated external force Fc is above a predetermined value α. With this arrangement, it is possible to easily and precisely detect the contact between the robot 100 and the human by an inexpensive structure.

(2) The robot 100 further comprises the acceleration sensor 14 which is provided on the carriage 1 to detect the acceleration of the carriage 1, and the correction unit 34 which corrects the external force F detected by the force sensor 13 based on the acceleration detected by the acceleration sensor 14. The judgment unit 33 judges that the robot 100 has contacted the human when the difference ΔF between the corrected external force Fa and the calculated external force Fc is above a predetermined value α. With this arrangement, it is possible to judge the contact taking the change in the detected external force F due to the acceleration or deceleration or vibration of the carriage 1 into consideration, whereby the contact between the robot and the human can be precisely detected.

(3) The judgment unit 33 judges that the robot 100 has made contact with the human when the difference ΔF1 between the amount of change of the external force F detected by the force sensor 13 and the amount of change of the external force Fc calculated by the force calculation unit 32 is above a predetermined value α1. With this arrangement, it is possible to detect the contact between the robot 100 and the human regardless of the difference ΔF between the detected external force F and the calculated external force Fc.

(4) The robot 100 is composed of the outer casing 16 which is secured to the robot support 12 and which covers the carriage 1, and the protection member 3 which is made of a material whose rigidity is lower than that of the outer casing 16 and covers the outer casing 16 and the robot main body 2. With this arrangement, when the carriage 1 (protection member 3) makes contact with the human, the contact force acting on the outer casing 16 through the protection member 3 is transmitted to the robot support 12, to thereby easily detect the contact between the robot 100 and the human. Moreover, if the robot 100 makes contact with the human, the shock can be reduced by the protection member 13.

(5) The robot 100 further includes the controller 35 which controls the electric motor 25 and the servo motor 26 so as to stop the operation of the carriage 1 and the robot main body 2 when the judgment unit 33 judges that the robot 100 has made contact with the human. With this arrangement, the operation of the robot 100 is immediately stopped to enhance the safety as soon as the robot 100 makes contact with the human.

(6) When the first predetermined value α and the second predetermined value β are preset to satisfy α>β, the controller 35 outputs the control signals to the electric motor 25 and the servo motor 26 to operate the carriage 1 or the robot main body 2 in the horizontal direction to reduce the detected external force F when the difference ΔF between the external force F detected by the force sensor 13 in the horizontal direction and the external force Fc calculated by the force calculation unit 32 in the horizontal direction is above the predetermined value β but below the predetermined value α. With this arrangement, it is possible to prevent the contact force between the robot 100 and the human from increasing, thereby preventing in advance the robot 100 from being stopped.

FIG. 3 is a block diagram showing the modification of FIG. 2. In FIG. 3, an intrusion detection unit 17 which detects the intrusion of a human into the working range of the robot 100 (movable area) is additionally provided. The intrusion detection unit 17 can be made of an area sensor or a visual sensor provided on the inside or outside of the carriage 1 (e.g., on the outside of the protection member 3). The working range is defined by a predetermine distance from the robot 100.

In this case, the controller 35 controls the electric motor 25 and the servo motor 26 so that the maximum speed of the robot main body 2 and the carriage 1 is set to the first speed V1 when no intrusion of a human is detected by the intrusion detection unit 17. The first speed V1 corresponds to, for example, the speed (normal speed) of the carriage 1 in the normal time. Setting the maximum speed to the first speed V1 means that the actual speed is not limited with respect to the commanded speed. Therefore, when the commanded speed is identical to the normal speed, the carriage 1 is moved at the normal speed.

On the other hand, when the intrusion of a human is detected by the intrusion detection unit 17, the controller 35 controls the electric motor 25 and the servo motor 26 so that the maximum speed of the robot main body 2 and the carriage 1 is identical to the second speed V2 which is lower than the first speed V1. The second speed V2 corresponds to a speed (safety speed) which is determined considering the safety upon contact. The second speed V2 is set to be not more than, for example 50%, of the first speed V1. Therefore, if the commanded speed is identical to the normal speed, the carriage travels at the safety speed which is lower than the normal speed, to thereby reduce a shock upon contact.

FIG. 4 is a block diagram of another embodiment of FIG. 2. In FIG. 4, the functional components of the control unit 15 are partly not illustrated. As can be seen in FIG. 4, the force sensor 13 has a first force sensor 131 and a second force sensor 132 which are identical to each other. The first force sensor 131 and the second force sensor 132 are juxtaposed to output identical values. The control unit 15 includes a first CPU 151 and a second CPU 152 which are identical in structure to each other. At least one of the first and second CPUs 151 and 152 is provided with the aforementioned controller 35. The signal from the first force sensor 131 is input to the first CPU 131 and the signal from the second force sensor 132 is input to the second CPU 152.

The first and second CPUs 151 and 152 mutually monitor the output values of the signals from the first and second force sensors 131 and 132 and judge whether the difference therebetween is above a predetermined value. If the difference in the output value between the first and second force sensors 131 and 132 is above the predetermined value, the controller 35 outputs the control signals to the electric motor 25 and the servo motor 26 to stop the operation of the carriage 1 and the robot main body 2. As a result, if the output value of one of the first and second force sensors of the force sensor 13 becomes abnormal due to failure, etc., the robot 100 stops operating, thus leading to high safety.

Figure 5:
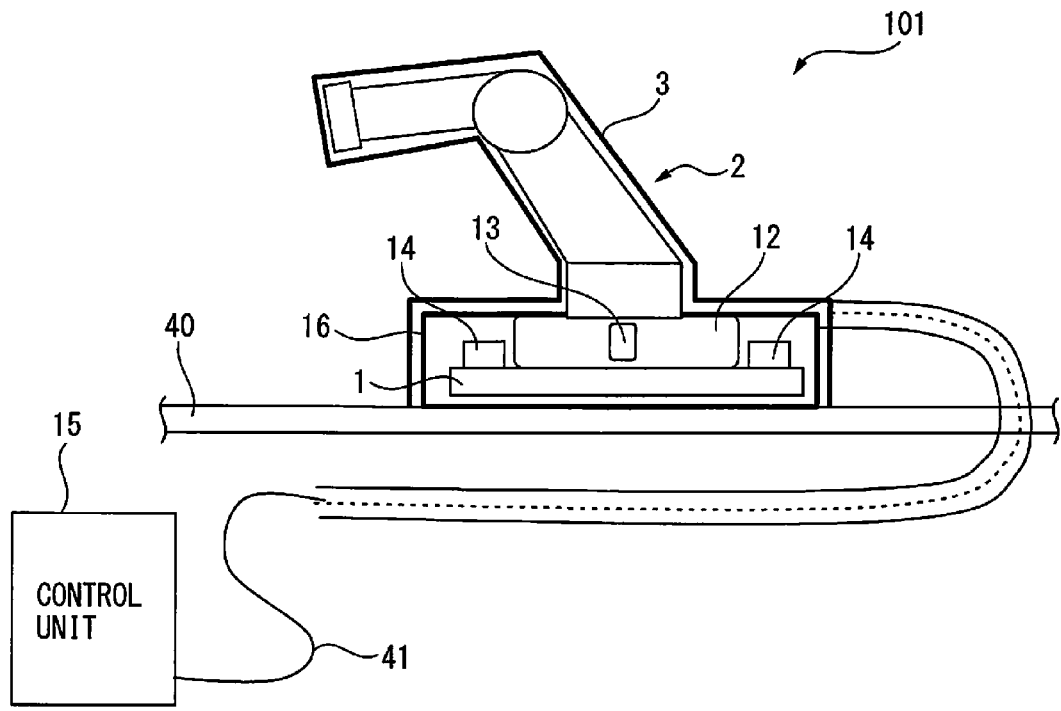
FIG. 5 is a side view of a mobile collaborative robot according to a modified embodiment of FIG. 1.

FIG. 5 is a side view of the robot 101 according to a modified embodiment of FIG. 1. Unlike the embodiment illustrated in FIG. 1, in FIG. 5, a rail 40 is provided to extend along the floor and the carriage 1 does not have the wheels 11 and is moveable along the rail 40. The control unit 15 is fixed at a position spaced from the carriage 1. The control unit 15 is connected to the robot 101 through a power supply and communications cable 41. The structure of the control unit 15 is the same as that in FIG. 1 and the control unit 15 executes the same operations as mentioned above. In FIG. 5, it is not necessary to provide the battery or communication unit on the carriage 1, and accordingly, it is possible to miniaturize the robot 101 (in particular, the carriage 1).

Figure 6:
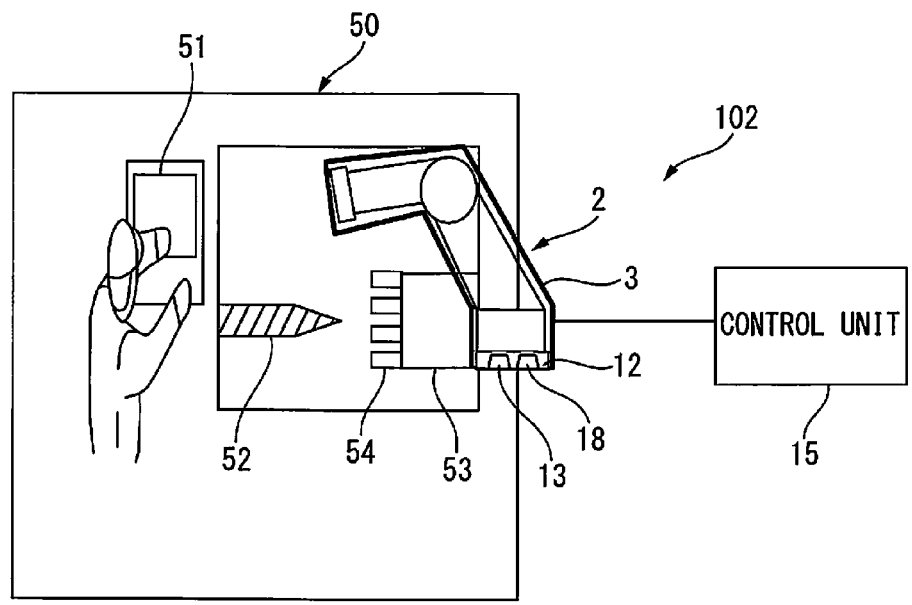
FIG. 6 is a side view schematically showing the structure of a mobile collaborative robot according to another modification of FIG. 1.

FIG. 6 is a side view of the robot 102 according to another modification of FIG. 1. The mobile collaborative robot 102 shown in FIG. 6 is applied to a machine tool 50. In the machine tool 50, the tool 52 is driven by operating the control panel 51 by, for example, an operator to machine the workpiece 54 provided on the table 53. The robot main body 2 is configured to be adapted to exchange the workpiece for the machine tool, and is secured to the workpiece support 12 provided on the frame of the machine tool. The workpiece support 12 is provided with the force sensor 13 which detects the external force acting on the robot support 12 and the acceleration sensor 18 which detects the acceleration generated in the robot support 12. The drive of the robot main body 2 is controlled by the control unit 15. The control unit 15 may be commonly used as a control unit for the machine tool 50.

Figure 7:
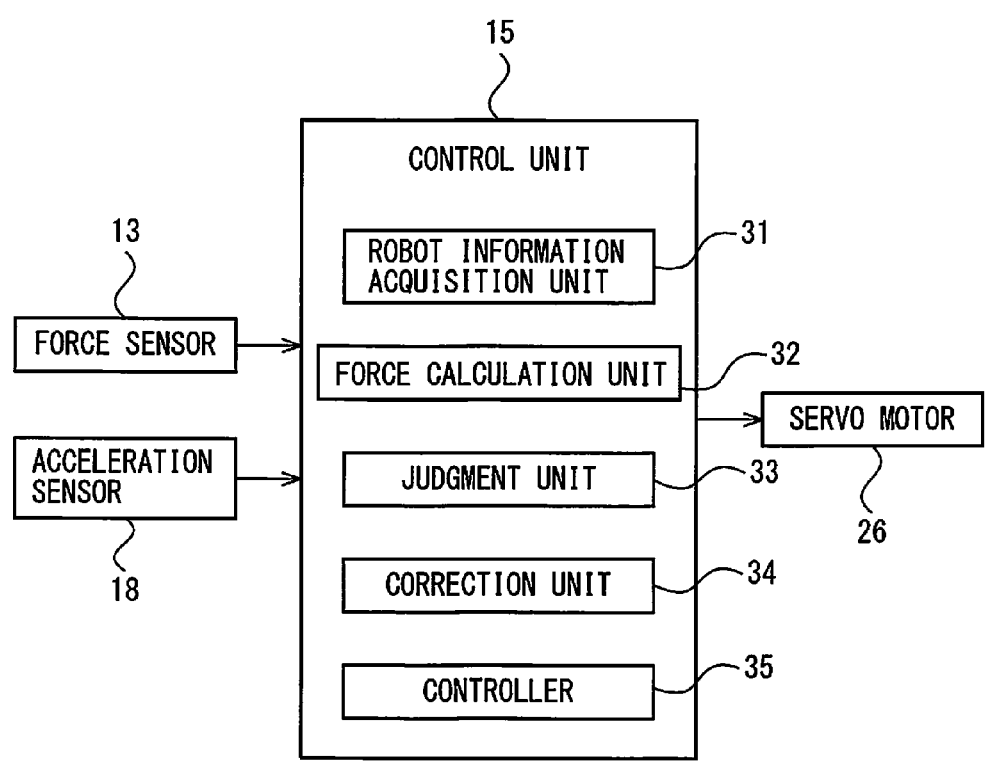
FIG. 7 is a block diagram of a control mechanism of a mobile collaborative robot illustrated in FIG. 6.

FIG. 7 is a block diagram for the control mechanism of the robot 102. The control unit 15 is composed of the robot information acquisition unit 31, the force calculation unit 32, the judgment unit 33, the correction unit 34, and the controller 35, as in FIG. 2. The robot information acquisition unit 31 acquires robot information including the posture information of the robot main body 2, and the load information representing the load acting on the robot main body 2. The force calculation unit 31 calculates the external force Fc acting on the robot support 12 based on the robot information acquired by the robot information acquisition unit 31.

The correction unit 34 corrects the external force F detected by the force sensor 13 based on the acceleration detected by the acceleration sensor 18. The judgment unit 33 judges that the robot 102 has made contact with the human when the difference ΔF between the external force Fa corrected by the correction unit 34 and the external force Fc calculated by the force calculation unit 32 is above a predetermined value α or when the difference ΔF1 between the amount of change of the external force Fa corrected by the correction unit 34 and the amount of change of the external force F calculated by the force calculation unit 32 is above the predetermined value α1. The controller 35 outputs the control signal to the servo motor 26 to stop the operation of the robot main body 2 when the judgment unit 33 judges that the robot 102 has made contact with the human.

As may be understood from the foregoing, as the acceleration sensor 18 is provided on the robot support 12 which supports the robot main body 2 and the detection value of the force sensor 13 is corrected by the correction unit 34, even if the robot main body 2 receives vibration from the machine tool 50, the influence of the vibration is removed from the detection value of the force sensor 13, and accordingly, the contact of the robot 102 with a human can be precisely detected. In other words, when the robot main body 2 is provided on the machine tool 50 or a large machine is operated in the vicinity of the robot main body 2, the robot support 12 vibrates and consequently, the detection value of the force sensor 13 changes, thus resulting in an erroneous detection of the contact between the robot 102 and the human. However, such an erroneous detection can be prevented by correcting the detection value of the force sensor 13 by the acceleration sensor 18 provided on the robot support 12.

The aforementioned embodiments and modifications can be further modified as flows.

Although the carriage 1 is provided with the robot support 12 and the carriage 1 is moved by driving the electric motor 25 in the aforementioned embodiments, it is possible to form the first actuator from other components than the electric motor 25 and the structure of the carriage 1 is not limited to those mentioned above.

Although the robot main body 2 is configured to be an articulated robot and is driven by driving the servo motor 26, in the aforementioned embodiments, the structure of the robot main body is not limited to those of the aforementioned embodiments provided that it is supported by the robot support 12 on the carriage and is driven by driving the second actuator. The structure and the mounting position of the force sensor 13 and the number of the force sensors 13, etc., are not limited to a specific structure, a specific mounting position or a specific number, provided that the sensor or sensors are provided on the robot support 12 and detect the external force F acting on the robot support 12.

Although the detection value F of the force sensor 13 is corrected by the correction unit 34 in the aforementioned embodiments, the correction unit 34 can be dispensed with. In other words, the structure of the judgment unit 33 can be of any type as long as it is judged that the robot 100 has made contact with a human when the difference ΔF between the external force F detected by the force sensor 13 and the external force Fc calculated by the force calculation unit 32 is above the predetermined value α or when the difference ΔF1 between the amount of change of the external force detected by the force sensor 13 and the amount of change of the external force calculated by the force calculation unit 32 is above the predetermined value α1. Although a pair of acceleration sensors 14 are provided on the carriage 1 to detect the acceleration of the carriage 12, in the aforementioned embodiments, the number of the acceleration sensors 14 may be one or more than two. When a plurality of acceleration sensors 14 are provided, it is possible to acquire detailed acceleration information of the carriage 1 whereby the detection value of the force sensor 13 can be precisely corrected by the correction unit 34.

EFFECT OF THE INVENTION

According to the present invention, the force sensor is provided on the robot support on the carriage and it is judged that the mobile collaborative robot has made contact with a human when the difference between the external force detected by the force sensor and the external force calculated based on the robot information is above a predetermined value or when the difference between the amount of change of the detected external force and the amount of change of the calculated external force is above a predetermined value. With this arrangement, the contact of the mobile collaborative robot with a human can be easily and precisely detected by an inexpensive structure.

The aforementioned description has been directed to examples of the present invention and the present invention is not limited to the embodiments and the modifications thereof mentioned above without departing from the features of the invention. The constituent components of the aforementioned embodiments and the modifications thereof include those which can be replaced or which are obviously replaceable while maintaining the identity of the invention. Namely, other aspects of the invention which can be considered within the scope of the technical idea of the invention are included in the scope of the present invention. Moreover, it is possible to combine the aforementioned embodiment(s) and the modification(s) thereof.

What is claimed is:

1. A mobile collaborative robot which carries out tasks in cooperation with a human, comprising
    a carriage which has a robot support and which is moved by driving a first actuator,
    a robot main body which is supported by the robot support on the carriage and which is operated by driving a second actuator,
    a force sensor which is provided on the robot support to detect an external force acting on the robot support,
    a robot information acquisition unit which acquires robot information including posture information of the robot main body and load information of a load acting on the robot main body,
    a force calculation unit which calculates the external force acting on the robot support based on the robot information acquired by the robot information acquisition unit, and
    a judgment unit which judges that the mobile collaborative robot has made contact with a human when a difference between the external force detected by the force sensor and the external force calculated by the force calculation unit is above a predetermined value or when a difference between the amount of change in the external force detected by the force sensor and the amount of change in the external force calculated by the force calculation unit is above a predetermined value.

2. A mobile collaborative robot according to claim 1, further comprising
    an acceleration sensor which is provided on the carriage to detect an acceleration of the carriage, and
    a correction unit which corrects the external force detected by the force sensor based on the acceleration detected by the acceleration sensor,
    wherein the judgment unit judges that the mobile collaborative robot has made contact with a human when a difference between the external force corrected by the correction unit and the external force calculated by the force calculation unit is above a predetermined value or when a difference between the amount of change in the external force corrected by the correction unit and the amount of change in the external force calculated by the force calculation unit is above a predetermined value.

3. A mobile collaborative robot according to claim 1, further comprising
    an outer casing which is secured to the robot support and covers the carriage, and
    a protection member which covers the outer casing and the robot main body and has a rigidity lower than the outer casing,
    wherein the force sensor detects the external force acting on the robot support through the protection member and the outer casing.

4. A mobile collaborative robot according to claim 1, further comprising a controller which controls the first actuator and the second actuator to stop the operation of the carriage and the robot main body when the judgment unit judges that the mobile collaborative robot has made contact with a human.

5. A mobile collaborative robot according to claim 4, wherein
    the force sensor detects the external force acting on the robot support at least in the horizontal direction,
    the force calculation unit calculates the external force acting on the robot support at least in the horizontal direction based on the robot information acquired by the robot information acquisition unit,
    the predetermined value is a first predetermined value and a second predetermined value which is smaller than the first predetermined value is set in advance,
    the controller controls the first actuator and the second actuator to move the carriage or the robot main body in a horizontal direction to reduce the external force detected by the force sensor when a difference between the external force detected by the force sensor in the horizontal direction and the external force calculated by the force calculation unit in the horizontal direction is above the second predetermined value but below the first predetermined value.

6. A mobile collaborative robot according to claim 4, wherein
the force sensor has a first force sensor and a second force sensor which are arranged to output identical values,
the mobile collaborative robot comprises a first CPU to which a signal from the first force sensor is input and a second CPU to which a signal from the second force sensor is input,
said first and second CPUs being configured to mutually monitor the output value of the signal from the first force sensor and the output value of the signal from the second force sensor to judge whether the difference therebetween is above a predetermined value,
the controller is provided on at least one of the first and second CPUs and controls the first actuator and the second actuator to stop the carriage and the robot main body when the first and second CPUs judge that a difference between the output value of the signal from the first force sensor and the output value of the signal from the second force sensor is above the predetermined value.

7. A mobile collaborative robot according to claim 4, further comprising
an intrusion detection unit which detects an intrusion of a human in the operation range of the mobile collaborative robot,
wherein when no intrusion of a human is detected by the intrusion detection unit, the controller controls the first actuator and the second actuator so that the maximum speed of the robot main body and the carriage is identical to a first speed, and when an intrusion of a human is detected by the intrusion detection unit, the controller controls the first and second actuators so that the maximum speed of the carriage and the robot main body is identical to a second speed which is lower than the first speed.

8. A mobile collaborative robot according to claim 4, further comprising
a power supply battery, and
a communication unit which wirelessly communicates with the outside of the mobile collaborative robot,
wherein
the carriage has a plurality of wheels by which the carriage is movable in the horizontal directions,
the judgment unit and the controller are included in a control unit,
the control unit, the battery and the communication unit are provided on the carriage.

9. A mobile collaborative robot according to claim 4, wherein
the carriage is provided on a horizontally extending rail so as to move therealong,
the judgment unit and the controller are included in a control unit arranged apart from the carriage,
the control unit is connected to the carriage and the robot main body through a cable.

10. A mobile collaborative robot which carries out tasks in cooperation with a human, comprising
a robot main body which is supported by a robot support and which is operated by driving an actuator,
a force sensor which is provided on the robot support to detect an external force acting on the robot support,
a robot information acquisition unit which acquires robot information including posture information of the robot main body and load information of a load acting on the robot main body,
a force calculation unit which calculates the external force acting on the robot support based on the robot information acquired by the robot information acquisition unit,
an acceleration sensor which is provided on the robot support to detect an acceleration generated in the robot support,
a correction unit which corrects the external force detected by the force sensor based on the acceleration detected by the acceleration sensor, and
a judgment unit which judges that the mobile collaborative robot has made contact with a human when a difference between the external force corrected by the correction unit and the external force calculated by the force calculation unit is above a predetermined value or when a difference between the amount of change in the external force corrected by the correction unit and the amount of change in the external force calculated by the force calculation unit is above a predetermined value.

* * * * *